| United States Patent [19] | [11] Patent Number: 4,965,845 |
| Chan et al. | [45] Date of Patent: Oct. 23, 1990 |

[54] COMPRESSION AND RECONSTRUCTION OF COLOR AERONAUTICAL CHART IMAGES

[75] Inventors: Luen C. Chan, Indian Harbour Beach; Kenrick W. Kautz, Palm Bay, both of Fla.

[73] Assignee: Harris Corporation, Melbourne, Fla.

[21] Appl. No.: 145,980

[22] Filed: Jan. 20, 1988

Related U.S. Application Data

[63] Continuation of Ser. No. 773,228, Sep. 5, 1985, abandoned.

[51] Int. Cl.$^5$ .............................................. G06K 9/00
[52] U.S. Cl. ...................................... 382/56; 358/133
[58] Field of Search ............... 382/18, 51, 56; 358/80, 358/75, 133, 261.3, 262.1, 11, 12, 13; 356/406; 340/703

[56] References Cited

U.S. PATENT DOCUMENTS

| 3,976,982 | 8/1976 | Eiselen | 382/44 |
| 4,183,046 | 1/1980 | Dalke | 340/703 |
| 4,301,469 | 11/1981 | Modeen et al. | 382/56 |
| 4,302,775 | 11/1981 | Widergren | 358/136 |
| 4,319,267 | 3/1982 | Mitsuya | 358/260 |
| 4,346,402 | 8/1982 | Pugsley | 358/80 |
| 4,369,463 | 1/1983 | Anastassiou | 358/135 |
| 4,375,650 | 3/1983 | Tiemann | 358/133 |
| 4,574,393 | 3/1986 | Blackwell | 382/18 |
| 4,580,134 | 4/1986 | Campbell | 340/703 |
| 4,606,065 | 8/1986 | Beg | 382/18 |

OTHER PUBLICATIONS

Scheinberg, Norman, "A Composite NTSC Color Video Bandwidth Compressor", Dec. 1984.
Kunt, Murat, "Second-Generation Image-Coding Techniques".

*Primary Examiner*—David K. Moore
*Assistant Examiner*—Michael R. Cammarata
*Attorney, Agent, or Firm*—Evenson, Wands, Edwards, Lenahan & McKeown

[57] ABSTRACT

A scheme for compressing and reconstructing multi-color high resolution navigation image data, such as aeronautical chart images provides an effective bit rate of one bit per pixel. Data representative of the image of a color aeronautical chart is sampled for a plurality of aerial grid points of the image (corresponding to pixels of the displays) each sample being digitized to provide an original color-representative matrix of data points, each resolved to some number of digital bits per basic color, per sample point. The color data is transformed into data representative of luminance (Y) and in-phase and quadrature chrominance (I, Q) components thereof. The Y, I, Q values are compressed using a clustering process that produces, for an aeronautical chart, sixteen clusters of combinations of colors and shades in the Y, I, Q domain. Then, for each sample point, a four bit code representative of the centroid of the three dimensional (Y, I, Q) cluster in which its transformed color/-shade value is located is generated, resulting in a preliminary bit rate of six-to-one (four bits per pixel). This preliminarily compressed color image data is further processed using a four-to-one compression code-table to obtain the desired one-bit/pixel bit rate.

16 Claims, 3 Drawing Sheets

COMPRESSION AND RECONSTRUCTION OF COLOR AERONAUTICAL CHART IMAGES

This is a continuation of application Ser. No. 773,228, filed Sept. 5, 1985, now abandoned.

FIELD OF THE INVENTION

The present invention relates to imagery data processing systems and is particularly directed to a scheme for effecting the compression and reconstruction of digitized color aeronautical chart images.

BACKGROUND OF THE INVENTION

For the navigation of an aircraft along a route to a specified destination, the pilot makes use of various types of on-board equipment, including sophisticated navigational computer systems which are capable of providing guidance information such as heading, altitude, geographical position, ground speed, and the like. To obtain a complete picture of the flight path of the aircraft the pilot also makes use of an aeronautical chart that contains geographical data including elevation and cultural terrain features such as rivers, lakes, natural rock formations and vegetation, as well as man-made cultural features, such as roads, towns, and significant structures, each uniquely identified in the map by a specific color for the purpose. For example, a lake may be shown on the map using a deep or dark blue color, while a river or stream feeding the lake may be a light blue color, and a surrounding forest a dark shade of green.

In order to incorporate the aeronautical chart with other aspects of the aircraft's guidance equipment, the chart is normally presented to the pilot via a cockpit display, such as a cathode ray tube (CRT) display, with various navigation indicators superimposed on the displayed chart. Because the pilot is normally interested in observing only a prescribed portion of the map which represents an area of terrain immediately surrounding the geographical position over which the aircraft is currently flying, yet the map display must be capable of providing coverage for hundreds of miles of an overall flight path, the provision of an electronic data base from which such map data may be accessed could involve an on-board memory storage capacity that would be prohibitive due to space and weight restrictions placed on airborne system components. To satisfy these requirements, aircraft display digital data bases are typically stored in a compressed format with a resolution of some number of plural bits per pixel of the CRT display, the storage mechanism consisting, for example, of a magnetic storage medium, such as a magnetic tape or disc. In the reconstruction processor on-board the aircraft, the stored compressed data is decompressed and the original image reconstructed for display to the pilot. Unfortunately, compression/reconstruction techniques that have been proposed to date have limited resolution capability and/or are extremely complex to implement, so that they suffer from a substantial airborne storage and processing penalty that limits their practical use.

SUMMARY OF THE INVENTION

In accordance with the present invention, there is provided a new and improved scheme for compressing and reconstructing multi-color high resolution navigation image data, such as aeronautical chart images, and which, for a standard 512×512 pixel display, is capable of producing an effective compression ratio of 24:1, thereby providing an effective bit rate of one bit per pixel. Pursuant to the compression mechanism employed in accordance with the present invention, data representative of the image of a color aeronautical chart, such as one derived by imaging the chart via a conventional camera tube, is sampled for a plurality of aerial grid points of the image (corresponding to pixels of the display) each sample being digitized, to provide an original color-representative matrix of data points, each resolved to some number of digital bits (e.g. eight) per basic color (e.g. red, green, blue), per sample point (display pixel equivalent).

These twenty-four color data bits per sample point of the basic color data are transformed into a corresponding number (twenty-four bits) of data bits representative of the luminance (Y) and in-phase and quadrature chrominance (I,Q) components thereof. The Y,I,Q values are compressed using a clustering process that produces, for an aeronautical chart, sixteen clusters of combinations of colors and shades in the Y,I,Q domain. Then, for each sample point, a four bit code representative of the centroid of the three dimensional (Y,I,Q) cluster in which its transformed color/shade value is located is generated, resulting in a preliminary compression ratio of six-to-one (four bits per pixel).

This preliminarily compressed color image data is further processed using a four-to-one compression code-table to obtain the desired one-bit/pixel bit rate. The compression code-table is based upon the observation that, for a digitized chart image, the number of distinct colors in an N×N (e.g N=4) pixel neighborhood is small; correspondingly, the number of possible distinct color combinations in the neighborhood is also small. Advantageously, for a color aeronautical chart image, it turns out that the number of color combinations is less than or equal to $2^{16}$, so that the sixty-four bits for any 4×4 pixel neighborhood in the chart by which the sixteen pixels of the neighborhood are defined can be compressed to sixteen bits by a lookup table (having a capacity of $^{64}$ data values of sixteen bits each), thereby achieving the additionally sought-after four-to-one compression ratio. Where the number of color combinations for a particular multi-color image application is larger than a prescribed memory capacity (e.g $2^{64}$ addresses for use with an aeronautical color chart), the color/shade code combinations may be subjected to a neighborhood thinning process or processed by correlating each sixteen bit code with a (reference) set of prescribed patterns through which the additional compression process for obtaining the one-bit per pixel bit rate is achieved.

DETAILED DESCRIPTION

Figure 1:
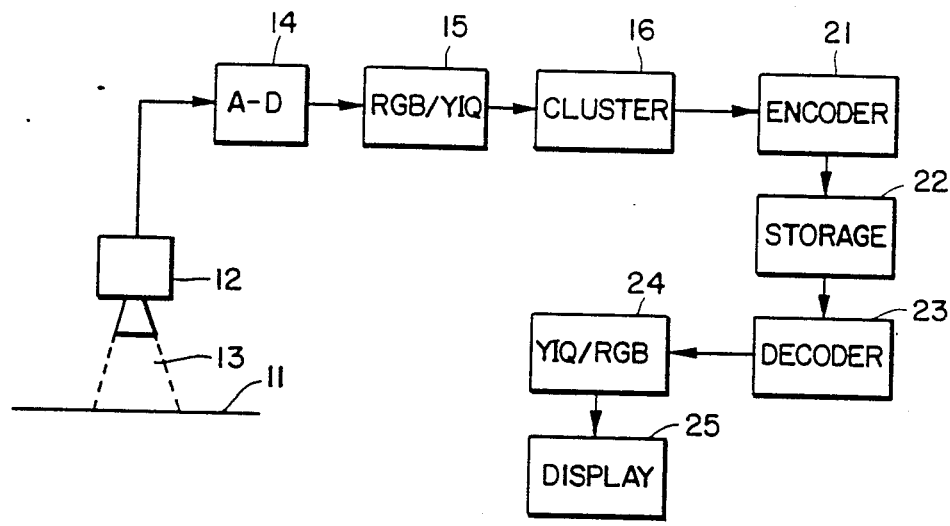
FIG. 1 is a block diagram of a system for compressing and reconstructing color aeronautical chart image data in accordance with the present invention.

Referring now to FIG. 1, there is shown a block diagram of a system for compressing and reconstructing aeronautical color chart images in accordance with the present invention. Before describing, in detail, the components, interconnection and operation of the system of FIG. 1, it should be observed that the invention resides primarily in a novel combination of conventional data/-signal processing circuits and not in the particular detailed configurations thereof. Accordingly, the structure, control and arrangement of such conventional circuits have been illustrated in FIG. 1 in block diagram format which shows only those specific details that are pertinent to the invention, so as not to obscure the disclosure with structural details which will be readily apparent to those skilled in the art having the benefit of the description herein. Thus, the block diagram illustration does not necessarily represent the mechanical structural arrangement of the exemplary system, but is intended primarily to illustrate the majoral structural components of the system in a convenient functional grouping, so that the present invention may be more readily understood.

As described briefly above, the inventive system is directed to a scheme for compressing color aeronautical chart images for storage in a medium that may be readily incorporated with present day vehicles (e.g. aircraft) for reconstructing a display image in display equipment thereon. For purposes of the present description, the display equipment will be assumed to be a conventional cathode ray tube color display having an image display matrix of 512×512 picture elements (pixels). Pursuant to the compression capability of the invention, the image of an aeronautical color chart to be displayed is encoded digitally and the digital encoding representation is compressed to provide an effective one bit per pixel bit rate.

At the front end of the system, wherein the aeronautical chart is prepared for storage in an electronically accessible data base, such as a magnetic tape or disk, the chart itself is presumed to be a color map containing various geographical data including elevation and cultural terrain features, such as lakes, rivers, rock formations, vegetation, as well as man made features such as roads, towns, etc.

In the system shown in FIG. 1, a color aeronautical chart 11 is placed on a flat surface, such as a table, within the field of view 13 of an imaging camera 12, such as a conventional television raster scan camera. Camera output signals respective of basic color components (red, blue, green) of the image of the map are digitized by analog-to-digital converter 14 to produce a matrix of digital code values, each of which is comprised of a prescribed number of bits (e.g. eight) representative of the shade of gray for each respective basic color component (red, blue and green) at a matrix of sample points in the field of view of the camera, corresponding to a matrix of picture elements to be displayed (here, corresponding to 512×512 pixel matrix).

Figure 2:
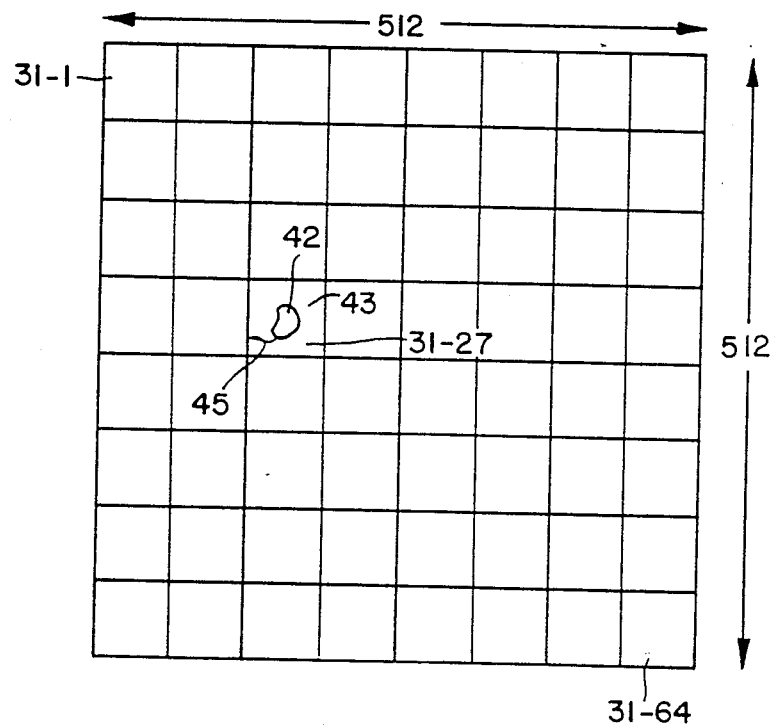
FIG. 2 is a diagrammatic illustration of a matrix of sampling points for a color aeronautical chart processed by the system of FIG. 1.

A diagrammatic illustration of a 512×512 matrix of sampling points of the aeronautical chart image as viewed by camera 12 is shown in FIG. 2. For purposes of the diagrammatic illustrations to be described below, FIG. 2 is shown as a gridwork of 8×8 blocks 31-1 ... 31-4, each of which contains a matrix of 64×64 sampling points. In order to facilitate an understanding of the present invention, the manner in which map features located in one of the blocks of sampling points of FIG. 2 is processed will be described. For this purpose, as shown in FIG. 2, block 31-27 is shown as containing three respective terrain features each having its own respective color. Specifically, in that portion of the color aeronautical chart 11 defined by block 31-27, there are a lake 42, a surrounding forest 43, and a river 45 flowing into the lake. On the aeronautical chart, the lake has a dark blue color, while the river flowing into the lake is of a lighter blue color, with a surrounding forest a dark green color. Thus, for each of the (64×64) sample points lying within block 31-27, the output of A-D converter 14 will produce respective 24 bit codes (eight red bits, eight green bits, eight blue bits) which, in the present example, will correspond to one of the dark blue, light blue or dark green colors of the terrain features of the lake, river or forest.

Analysis of color usage in aeronautical charts has revealed that only a relatively small number (usually about 10) of unique colors are used in preparing aeronautical charts. Of these colors, only a small number may have different color shade values (shades of gray). In fact, as documented by various Defense Mapping Agency map production specifications, there are typically no more than sixteen combination of colors and shades of gray in an aeronautical chart. To take advantage of this numerical limitation in the color/shades of gray combinations of a color aeronautical chart, the compression scheme according to the present invention initially performs a basic color (R,B,G)-to-luminance/-chrominance (Y,I,Q) transform operation to convert the color data into a format which may be significantly compressed through cluster/histogram processing.

More specifically, as shown in FIG. 1, the output of analog-to-digital converter 14 (which produces for each pixel/sampling point a multi-bit code representative of the three basic colors of red, blue and green (8-red bits, 8-blue bits and 8-green bits)) is coupled to a color transform unit 15 which converts the red, green and blue-representative data into luminance (Y) and chrominance (in-phase (I) and quadrature (Q)) representative data. At this point, there is no compression of the data, but simply a color space transformation. To effect the luminance/chrominance transformation from the red, green and blue color-representative data produced by converter 14, color transform unit 15 is comprised of a set of matrix multipliers, which may be implemented either combinational logic or through a suitably programmed data processor. Since RGB/YIQ transform algorithms are well known, no further description of the make-up of unit 15 will be described. What is important here is that the original color data for each sample point of the aeronautical chart 11 has been transformed to the luminance/chrominance domain, which considerably simplifies further processing, as will be described below.

The output of transform unit 15 is coupled to a luminance/chrominance clustering processor 16 which produces a histogram of the chrominance portion of each of the data values for the respective sample points of the image of interest. In the histogram, the I and Q chrominance values will tend to clump or "cluster" into regions representative of the distinct colors of the image. Within these regions in which the chrominance values have been clustered, the luminance values of the sample point will also tend to cluster around some shade-of-gray level. These respective chrominance and luminance clusters, with which the respective color data values produced by color transform unit 15 are associated, are then used to assign a specific cluster representative code for each sample value to effect an initial six-to-one compression of the data sample values.

Figure 3:
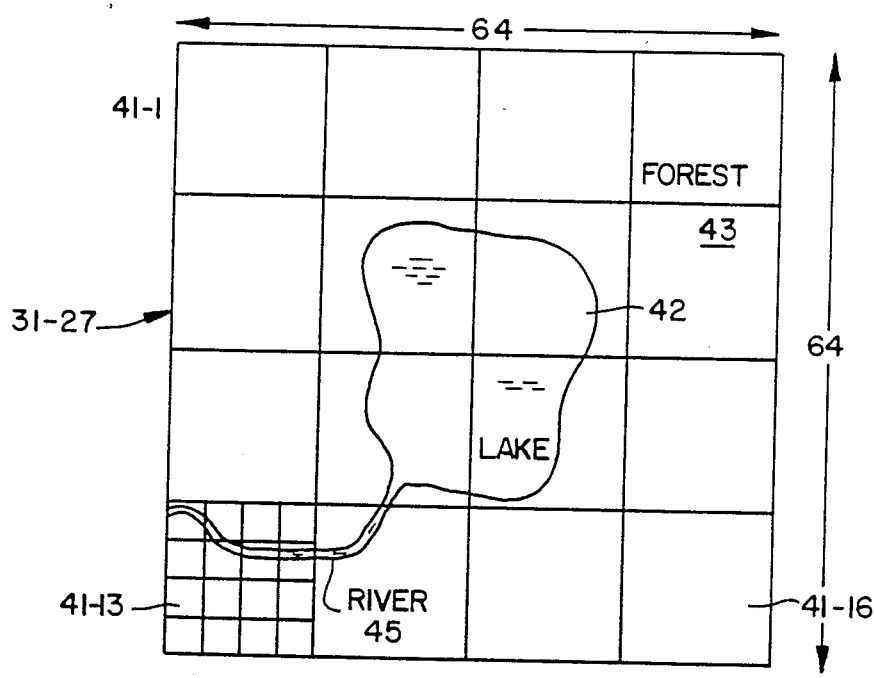
FIG. 3 is a diagrammatic illustration of an enlarged portion of the matrix of FIG. 2 showing map features therein in greater detail.
Figure 4:
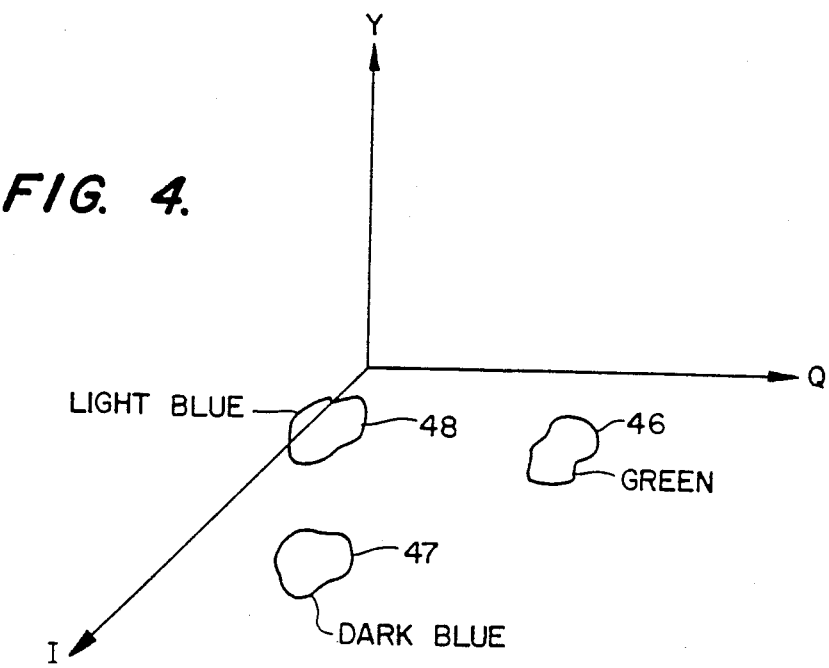
FIG. 4 is a diagrammatic illustration of a chrominance/luminance clustering histogram of the map features detailed in FIG. 3.

To facilitate an understanding of this process, attention is directed to FIG. 3 which shows an enlarged portion of sample point block 31-27 of FIG. 2 in which the lake 42 is shown as residing in the central four of a matrix of sixteen blocks 41-1 ... 41-16 of sample points, each block comprising a 16×16 array of points. River 45 is shown as extending through blocks 41-10, 41-12 and 41-13, with both the river 45 and the lake 42 being surrounded by the green foliage of the forest 43. A luminance/chrominance clustering histogram of the three color components of the chart image represented in FIG. 3 is shown in FIG. 4. For the present example, each of the sample points lying in the green forest portion of the image is shown as occupying a region in the I,Q plane having some shade of gray value (Y component), creating a three dimensional (Y,I,Q) cluster 46. In the illustration of FIG. 4, the darkest shades of gray are considered to lie in the IQ plane, while lighter shades are considered to have an increasingly significant Y component. In the present example, it is assumed that the color of the forest area 43 is a relatively dark green so that the color components of the chrominance samples are clustered in the vicinity of the I,Q plane as shown at 46.

The other two color components of the image portion employed in the present example are the dark blue color of the lake 42 and the light blue color of the river 45. In the I,Q plane, the blue components are shown in a region spaced apart from the green region. The darker blue color of the lake 42 is delineated by cluster 47 while the lighter blue color of the river 45 is delineated by cluster 48, which has a more pronounced luminance (Y) component because of its lighter shade of gray.

For the purpose of effecting the cluster histogram through which the color values of the respective samples produced by transform unit 15 are assigned, cluster processor 16 preferably employs a nearest neighbor algorithm, such as that described in chapter 6.10 entitled "Hierarchical Clustering", in the text "Pattern Classification and Scene Analysis", by R. O. Duda et al, John Wiley & Sons publishers. In the clustering processor, with each of the colors of the image having been defined by a respective (Y,I,Q) cluster, each of the twenty-four bit sample values is converted into a new data code value representative of the effective centroid of the cluster with which its particular color value as produced by transform unit 15 is associated. Thus, for the three color image of FIG. 3, having the corresponding three clusters 46, 47 and 48 of FIG. 4, each sample value of the image may be encoded using only a two bit code. In actuality, however, a typical aeronautical color chart contains up to sixteen color combinations, as described above, and therefore will produce a sixteen cluster histogram; a four bit code is therefore required for assigning the centroid of the cluster of each color of interest within the aeronautical chart. For the present example, only three of the color/shade combinations have been described in order to simplify the illustration.

As is the case with the color transform unit 15, cluster processing unit 16 may comprise either combinational logic or a processor, programmed to implement the above-referenced nearest neighbor algorithm for compressing twenty-four bit luminance/chrominance data values for each of the sample points supplied by transform unit 15 into four bit codes representative of one of sixteen possible color/shade cluster centroids in the cluster histogram in the Y,I,Q space, as illustrated in FIG. 4 (for the three color example presently described).

Figure 5:
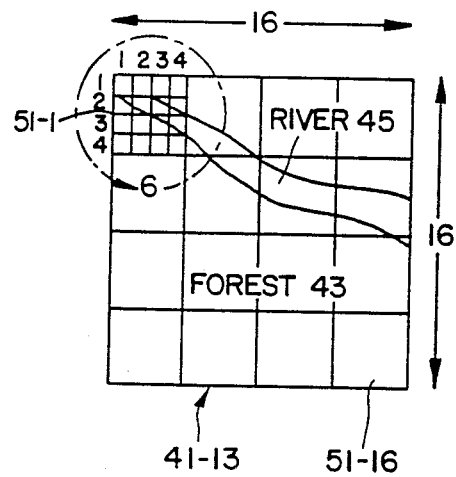
FIG. 5 is a diagrammatic illustration of an enlarged portion of the matrix portion of FIG. 3 showing map features thereof in greater detail.
Figure 6:
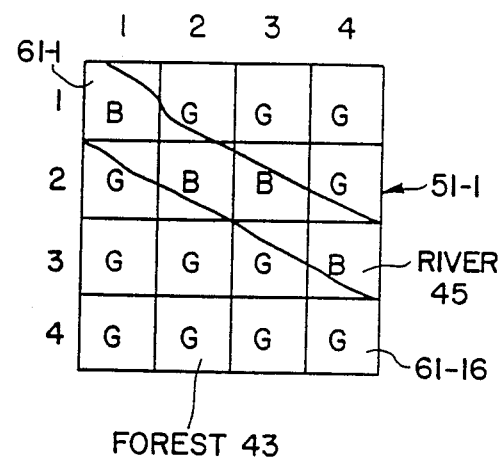
FIG. 6 is a diagrammatic illustration of an enlarged portion of the matrix portion of FIG. 5 showing map features thereof in greater detail.

In order to achieve the sought-after 24:1 compression ratio, namely an effective bit rate of one bit per pixel, a further 4:1 compression of the four bits per pixel produced by clustering processor 16 is carried out. To facilitate an understanding of this process, attention is directed to FIG. 5 which shows an enlarged portion of one of the 16×16 sample point blocks of FIG. 3. Specifically, FIG. 5 shows a portion of the river 45 and surrounding forest 43 in block 41-13 of FIG. 3 In FIG. 5, block 41-13 is shown as a matrix of 16 blocks of sample points each containing a 4×4 arrangement of sample points One of these 4×4 sample point blocks, specifically block 51-1, containing a portion of river 42 and surrounding forest 43 is shown in enlarged format in FIG. 6. In FIG. 6, block 51-1 is shown as comprised of sixteen sample points/pixels 61-1 ... 61-16 falling within the original 512×512 sample point image. On the actual aeronautical color chart, each of sample points/pixels 61-16 ... 61-16 has some color value which, through the operation of transform unit 15 and cluster processor 16, has been compressed to one of sixteen 4-bit color/shade cluster combination codes. From FIG. 6, it can be seen that the 4×4 sample point/pixel matrix is, in effect, a color combination pattern, wherein each of sample points/pixels 61-1 and 61-5 through 61-8 has a compressed code value corresponding to the light blue cluster of FIG. 4, whereas sample points/pixels 61-2 ... 61-4 and 61-9 ... 61-16 have a compressed (four-bit) code value corresponding to cluster 46, representing the green of the forest surrounding the river 42.

Figure 7:
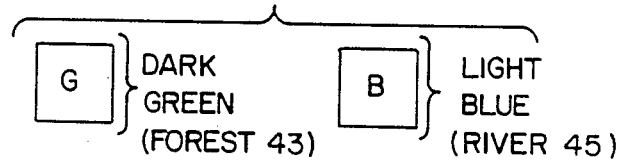
FIG. 7 shows respective color segment portions of which the matrix pattern of FIG. 6 is comprised.

FIG. 7 shows the specific assignment of compressed (four-bit) cluster color code values for the sample point/pixels of FIG. 6, with code G corresponding to the sample points/pixels lying in the dark green forest region 43 and color code value B corresponding to the sample points/pixels lying in the light blue river region 42.

In the course of the development of the present invention, numerous color aeronautical charts were analyzed and it was observed that for a digitized chart image, the number of distinct colors in a reasonably confined sample point/pixel neighborhood (e.g. a 4×4 neighborhood as illustrated in FIG. 6) is relatively small. As a result, the number of possible distinct color combinations in that neighborhood is also small. It turns out that the number of color combinations within any 4×4 sample point/pixel neighborhood in the aeronautical chart image is always less than or equal to $2^{16}$. As a result, it is possible to obtain a 4:1 compression ratio of the cluster code values produced by clustering processor 16 through a lookup table having $2^{64}$ memory locations each having a sixteen bit (color combination pattern) capacity. Such a lookup table is effectively what is contained in an encoder 21 which is coupled to the output of clustering processor 16.

More particularly, the output of clustering processor 16 is supplied to a lookup table 21 in groups of sixty-four bits representative of the cluster codes of each sample point/pixel a 4×4 neighborhood. Referring again to FIG. 6, which shows such a 4×4 neighborhood, it is to be recalled that each sample point/pixel is represented by a four bit code representing one of the sixteen possible color/shade cluster combinations, a portion of which are illustrated in FIG. 4 described above for the three color components of the sample of the lake 42, forest 43 and river 45 feeding the lake 42 shown in enlarged format in FIG. 3. Thus, clustering processor 16 couples respective sixty-four bit cluster code values (for respective 4×4 sample point/pixel neighborhoods) as input words for addressing a lookup table 21. The output of lookup table 21 is a sixteen bit code representative of one of up to $2^{16}$ neighborhood color code combinations of which an aeronautical color chart may be formed. In other words, for each sixty-four bit input to lookup table 21, there is produced a sixteen bit output or, in effect, a one bit-per-pixel bit rate. At the output of lookup table 21, the compressed data is stored in a suitable compact and light weight memory medium, such as a magnetic tape 22.

To reconstruct the compressed data, the storage medium 22 is coupled through a suitable playback mechanism and applied to a reconstruction lookup table or decoder 23 which corresponds to an inverse of the 4:1 compression ratio lookup table 21 in the compression processor. The output of lookup table 23 is then applied to a chrominance/luminance-to-primary color reproduction table 24 to reconstruct the original eight bits per basic color data values that were obtained from the original imaging unit (camera 12 and digitizer 14). The output of unit 24 is then coupled to the reconstruction display unit 25 for providing a display of the aeronautical color chart.

As pointed out above, analysis of the color combination patterns in a small (4×4) neighborhood grouping of sample point/pixels of an image of an aeronautical color chart permits the use of a lookup table, thereby simplifying the implementation of the compression mechanism for obtaining the 4:1 compression of the cluster codes provided by cluster processor 16 to obtain the sought after one bit-per pixel bit rate. If the characteristics of the color image being processed results in a number of color combinations within a small pixel neighborhood being larger than the practical $2^{16}$ number described here, the small neighborhood still can be represented with a sixteen bit number by allowing errors during reconstruction or by the use of a thinning process to effectively match substantially similar neighborhood patterns which may differ in only one or two sample point/pixel locations in a pattern having high correlation properties with each pattern. In fact, a nearest neighborhood processing technique corresponding to that of the cluster processing carried out by clustering processor 16 may be employed for this purpose. In this connection, it should be observed that the number $2^{16}$ is not critical to the practice of the invention, but is simply a convenient value that simplifies processing in the 512×512 pixel matrix of a typical color display, wherein eight bits per color are as signed for encoding the respective basic colors produced by the imaging opto-electronic components of the image digitizing unit and the fact that a typical aeronautical color chart contains no more than sixteen colors/shade combinations. As the parametric values for these respective components change, there is a corresponding change within the data groupings within the compression process for achieving the sought after one bit per pixel bit rate for archival storage.

As will be appreciated from the foregoing description, through the use of cluster processing and the recognition that the characteristics of a color aeronautical chart produce a manageable number of color patterns for small-numbered sample point neighborhoods, a highly simplified compression and reconstruction processing mechanism is afforded which offers an effective bit rate of one bit per pixel with high reconstruction quality and low implementation complexity.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. A method of compressing the effective bandwidth of digitally encoded signals representative of the color composition of picture elements that make up a multiple color image pattern comprising steps of:
    (a) transforming the color composition of each picture element into its luminance and in-phase and quadrature chrominance components;
    (b) generating a histogram of the luminance and chrominance components obtained in step (a) for the picture elements of said image pattern, said histogram being formed of a plurality of clusters of said luminance and chrominance components;
    (c) for each cluster of which said histogram generated in step (b) is formed, generating a respective first digital code representative thereof;
    (d) for each picture element, generating a second digital code, corresponding to that first digital code which is representative of the cluster to which the luminance and chrominance components of said each picture element is closest; and
    (e) for each of respective pluralities of said second digital codes associated with prescribed pluralities of neighboring picture elements of said multiple color image pattern, generating a third digital code representative of a prescribed combination of colors of which a respective one of said prescribed pluralities of neighboring picture elements within said multiple color image pattern may be formed.

2. A method according to claim 1, wherein step (e) comprises storing a plurality of third digital codes each of which is representative of respective combination of colors of which a plurality of neighboring picture elements may be comprised and, for each of said second digital codes, accessing one of said stored third digital codes.

3. A method according to 1, wherein the code length of said first digital code is less than the code length of the digitally encoded signals that are representative of the color composition of the picture elements that make up said multiple color image pattern.

4. A method according to claim 1, wherein each of said third digital codes comprises a multibit digital code having a number of bits corresponding to the number of neighboring picture elements of a prescribed plurality of neighboring picture elements.

5. A method according to claim 1, wherein said multiple color image pattern comprises a multiple color terrain map.

6. A method according to claim 1, wherein said digitally encoded signals are representative of video output signals derived from a video imaging device for respective picture elements of said multiple color image pattern as viewed by said imaging device.

7. A method according to claim 1, wherein each digitally encoded signal comprises a respective digital code signal representative of the red, green and blue color components of a respective picture element of said multiple color image pattern and step (d) comprises generating, for said respective picture element, a respective second digital code having a code length less than that of a respective digital code signal representative of the red, green and blue color components of a picture element of said multiple color image pattern, thereby effecting a first compression of the effective bandwidth of said digital code signals.

8. A method according to claim 7, wherein, in step (e), the number of second digital codes of a respective plurality of second digital codes corresponds to the number of bits of which a third digital code is comprised, thereby effecting a second compression of the effective bandwidth of said digital code signals which, together with said first compression, provides an overall effective bandwidth compression to one bit per picture element.

9. An apparatus for compressing the effective bandwidth of digitally encoded signals representative of the color composition of picture elements that make up a multiple color image pattern comprising in combination:

first means, to which said digitally encoded signals are applied, for transforming the color composition of each picture element into its luminance and in-phase and quadrature chrominance components, and generating output signals representative of a histogram of said luminance and in-phase and quadrature chrominance components, said histogram being formed of a plurality of clusters of said luminance and chrominance components;

second means, coupled to said first means, for generating, for each picture element, a first digital code which is representative of the cluster to which the luminance and chrominance components of said each picture element is closest; and third means, coupled to said second means, for generating, for each of respective pluralities of second digital codes associated with prescribed pluralities of neighboring picture elements of said multiple color image pattern, a third digital code representative of a prescribed combination of colors of which a respective one of said prescribed pluralities of neighboring picture elements within said multiple color image pattern may be formed.

10. An apparatus according to claim 9, wherein said third means comprises means for storing a plurality of third digital codes each of which is representative of respective combination of colors of which a plurality of neighboring picture elements may be comprised and, for each of said second digital codes, accessing one of said stored third digital codes.

11. An apparatus according to 9, wherein the code length of said first digital code is less than the code length of the digitally encoded signals that are representative of the color composition of the picture elements that make up said multiple color image pattern.

12. An apparatus according to claim 9, wherein each of said third digital codes comprises a multibit digital code having a number of bits corresponding to the number of neighboring picture elements of a prescribed plurality of neighboring picture elements.

13. An apparatus method according to claim 9, wherein said multiple color image pattern comprises a multiple color terrain map.

14. An apparatus according to claim 9, wherein said digitally encoded signals are representative of video output signals derived from a video imaging device for respective picture elements of said multiple color image pattern as viewed by said imaging device.

15. An apparatus according to claim 9, wherein each digitally encoded signal comprises a respective digital code signal representative of the red, green and blue color components of a respective picture element of said multiple color image pattern and wherein said first means includes means for generating, for said respective picture element, a respective second digital code having a code length less than that of a respective digital code signal representative of the red, green and blue color components of a picture element of said multiple color image pattern, thereby effecting a first compression of the effective bandwidth of said digital code signals.

16. An apparatus according to claim 15, wherein the number of second digital codes of a respective plurality of second digital codes corresponds to the number of bits of which a third digital code is comprised, whereby said third means effects a second compression of the effective bandwidth of said digital code signals which, together with said first compression, provides an overall effective bandwidth compression to one bit per picture element.

* * * * *